US012700377B2

(12) United States Patent
Li

(10) Patent No.: US 12,700,377 B2
(45) Date of Patent: Aug. 4, 2026

(54) METHOD FOR CORRECTING LOCAL-DIMMING PARAMETERS THROUGH GLOBAL BACKLIGHT ADJUSTMENT AND CIRCUIT SYSTEM THEREOF

(71) Applicant: REALTEK SEMICONDUCTOR CORP., Hsinchu (TW)

(72) Inventor: Huei-Wen Li, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 19/284,133

(22) Filed: Jul. 29, 2025

(65) Prior Publication Data

US 2026/0038448 A1 Feb. 5, 2026

(30) Foreign Application Priority Data

Jul. 30, 2024 (TW) ................................ 113128204

(51) Int. Cl.
*G09G 3/34* (2006.01)

(52) U.S. Cl.
CPC ... *G09G 3/3406* (2013.01); *G09G 2320/0233* (2013.01); *G09G 2320/066* (2013.01); *G09G 2320/0686* (2013.01); *G09G 2330/021* (2013.01); *G09G 2360/16* (2013.01)

(58) Field of Classification Search
CPC ..... G09G 2320/0233; G09G 2320/066; G09G 2320/0686; G09G 2330/021; G09G 2360/16; G09G 3/3406; G09G 3/3426
See application file for complete search history.

(56) References Cited

U.S. PATENT DOCUMENTS

2006/0244757 A1* 11/2006 Fang ........................ G06T 11/10
345/582
2010/0303344 A1* 12/2010 Sato ........................ H04N 23/84
382/162

FOREIGN PATENT DOCUMENTS

TW 202113789 A 4/2021

* cited by examiner

*Primary Examiner* — Insa Sadio

(74) *Attorney, Agent, or Firm* — Li & Cai Intellectual Property (USA) Office

(57) ABSTRACT

A method for correcting local-dimming parameters through global backlight adjustment and a circuit system are provided. The circuit system connects with a backlight control circuit of a display. In the method operated in the circuit system, when an image is received, the pixel values of each of the regions divided from the image can be counted so as to obtain a local maximum and a local average of every region, and a global average of the image. The region having a dark-field halo can be detected based on a local difference between the local maximum and the local average. A leakage level can be obtained by determining an impact of the dark-field halo on the whole image based on a threshold. The leakage level and the global average are referred to for calculating a gain for global backlight adjustment after performing local dimming.

15 Claims, 5 Drawing Sheets

METHOD FOR CORRECTING LOCAL-DIMMING PARAMETERS THROUGH GLOBAL BACKLIGHT ADJUSTMENT AND CIRCUIT SYSTEM THEREOF

CROSS-REFERENCE TO RELATED PATENT APPLICATION

This application claims the benefit of priority to Taiwan Patent Application No. 113128204, filed on Jul. 30, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for addressing problems relating to dark-field halos, and more particularly to a method that uses global backlight adjustment to correct local-dimming parameters according to a quantity ratio of a quantity of regions having dark-field halo in a whole image to global regions, and a circuit system.

BACKGROUND OF THE DISCLOSURE

A conventional local-dimming technology applied to a display panel is primarily to divide an image into M*N regions, and then performs different backlight controls on different regions. Specifically, a local dimming process is performed on the regions according to a brightness difference of each of the regions. The brightness difference of each of the regions is calculated by comparing a statistical result of image data (e.g., pixel value) of each of the M*N regions with a brightness average or a brightness on demand. A general dimming method is to drive a lower backlight value to a brighter region and apply data compensation on the regions so as to achieve purposes of increasing contrast and saving power consumption.

However, with regard to a backlight module of a display, if the brightness of backlight is uneven and changes dynamically, the conventional local-dimming technology can still experience a relevant side effect; for example, backlight halo may occur, or even be accompanied by a checkerboard-type of uneven halo when a display content belongs to a dark field.

SUMMARY OF THE DISCLOSURE

In response to the above-referenced technical inadequacies, where conventional local dimming technology causes backlight halo when the display content belongs to a dark field, provided in the present disclosure is a method for correcting local-dimming parameters through global backlight adjustment and a circuit system. The present disclosure provides an effective solution for improving the problem of uneven local brightness such as backlight halo and checkerboard-type halo.

The circuit system is electrically connected with a backlight control circuit of a display. The circuit system performs the method for correcting local-dimming parameters through global backlight adjustment. In the method, the circuit system receives an image and obtains pixel values of each of the regions divided from the image so that the regions having dark-field halo can be detected based on the pixel values of each of the regions. Afterwards, a quantity ratio of a quantity of regions having dark-field halo to a quantity of global regions is calculated. The circuit system relies on the quantity ratio to determine whether or not global backlight adjustment is to be performed on the image.

Further, the circuit system operates the method by firmware or a system-on-a-chip. In the method, the image is divided into the multiple regions, a local backlight brightness corresponding to each of the regions is provided according to the pixel values of each of the regions, and the circuit system outputs local-dimming parameters to a backlight control circuit after the local dimming process is performed.

Still further, a local maximum and a local average of each of the multiple regions can be obtained according to the pixel values of each of the regions. A local difference between the local maximum and the local average is referred to for determining whether any dark-field halo occurs in each of the regions.

Thus, a quantity ratio of a quantity of regions having dark-field halo to a quantity of global regions is obtained. When the quantity ratio is larger than a ratio threshold, the global backlight adjustment is performed on the image, and the circuit system outputs local-dimming parameters through global backlight adjustment to the backlight control circuit.

Further, the pixel values of each of the multiple regions divided from the image can be obtained by a statistical method, and a global average of the image can also be obtained. Thus, when the quantity ratio of the quantity of the regions having dark-field halo to the quantity of global regions is larger than a ratio threshold, the circuit system determines whether global backlight adjustment is performed on the image according to a global average.

Next, a lookup table is queried according to the global average so as to obtain an adjustment ratio for reducing backlight brightness when global backlight adjustment is performed on the image. Further, a quantity of regions where the local average for each of the regions is smaller than a first threshold and the local difference is larger than a second threshold can be counted. The ratio of the quantity of the regions and the quantity of global regions can be used to describe a level of halo formed when local dimming is performed on the image, and explain a light leakage level. The light leakage level and an adjustment ratio corresponding to the global average can be referred to at the same time for calculating a gain for global backlight adjustment.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 2:
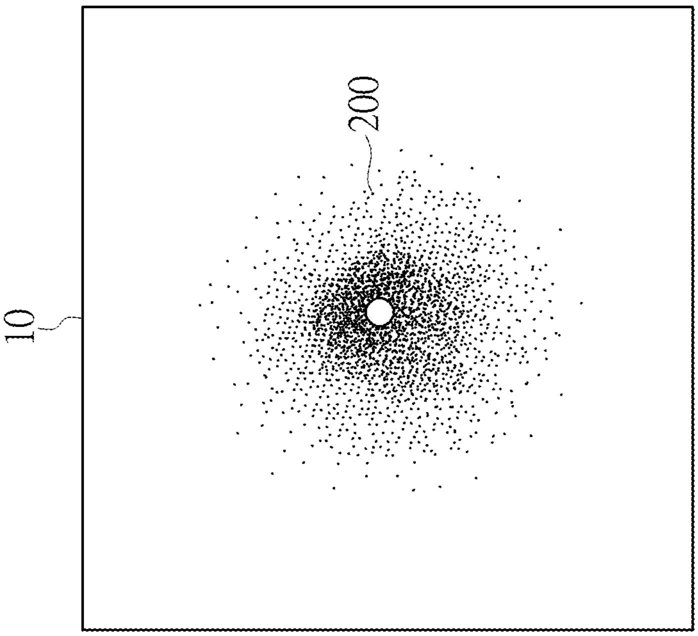
FIG. 2 is a schematic diagram showing dark-field halo formed when local dimming is in operation.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates a method for correcting local-dimming parameters through global backlight adjustment and a circuit system. In an aspect of the present disclosure, the circuit system can be implemented by firmware or a system-on-a-chip. The circuit system is electrically connected with a backlight control circuit of a backlight module of a display. The method for correcting local-dimming parameters through global backlight adjustment is performed by the circuit system, and one of the objectives of the method is to eliminate dark-field halo or checkerboard halo formed by multiple dark-field halos when the backlight control circuit operates local dimming. The method can optimize display content and enhance a user's viewing experience.

In a display that operates a local dimming process, a received image can be frame-by-frame divided into multiple regions in real time, and pixel values of each of the regions can be obtained. The pixel values are referred to for obtaining the brightness of each of the regions. The local dimming mechanism is used to provide local backlight brightness for each of the regions based on the brightness of every region. Accordingly, the circuit system outputs local-dimming parameters to the backlight control circuit after local dimming. For example, in the local dimming mechanism, the circuit system provides a higher brightness for the region (e.g., a bright field region) with a higher average brightness, and provides a lower brightness for the region (e.g., a dark field region) with a lower average brightness. This not only provides the advantage of saving power by controlling the brightness of the backlight, but the local dimming mechanism can also increase contrast of display content.

However, since the conventional local dimming mechanism provides a higher brightness for the bright field region but a lower brightness for the dark field region, the multiple regions of one display content may have different brightness. Therefore, the local dimming process performed on the backlight module may result in regional brightness differences among the regions, so that the phenomenon such as halo, light leakage or checkerboard-type halo may occur in the display panel.

Figure 1:
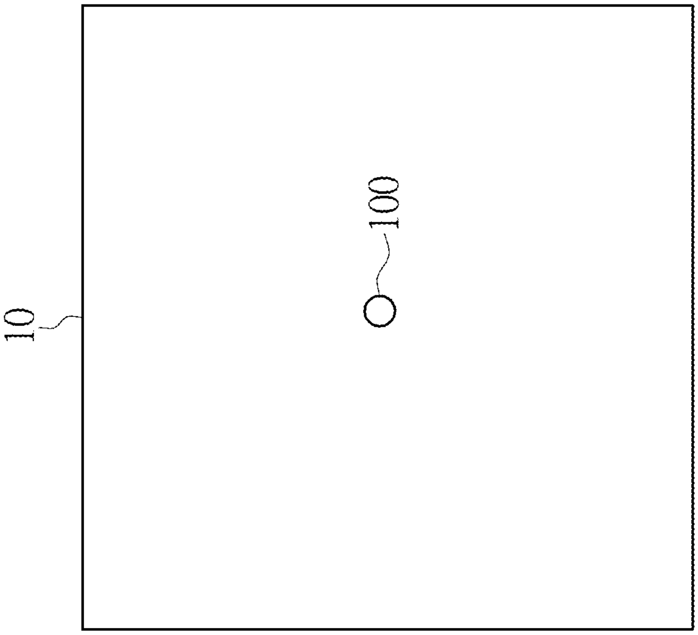
FIG. 1 is a schematic diagram showing a light spot on a dark-field image.
Figure 3:
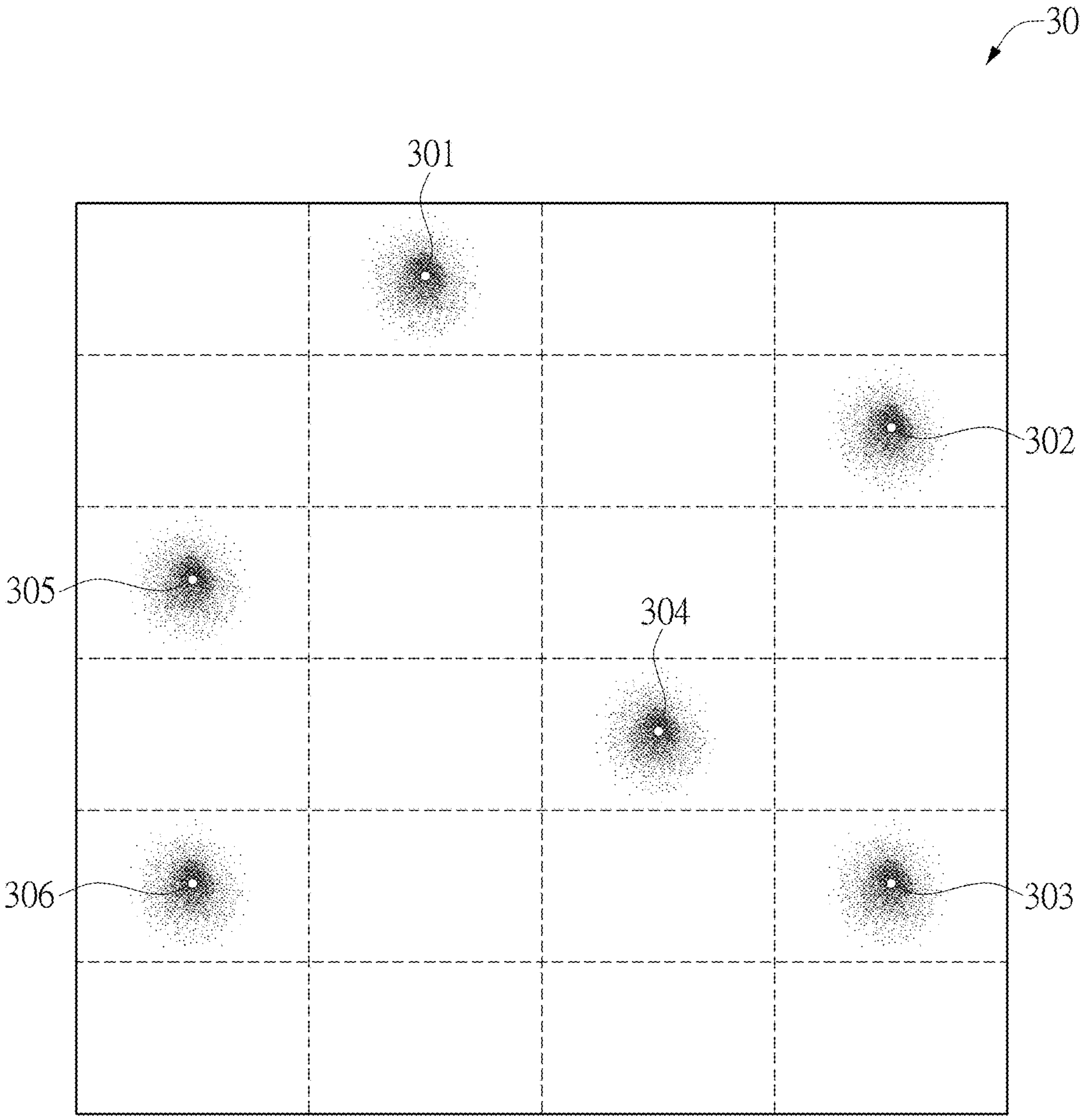
FIG. 3 is a schematic diagram showing checkerboard-type halos formed when local dimming is in operation.

References are made to FIG. 1 through FIG. 3, which are the exemplary diagrams showing different types of halos formed on the dark-field images.

FIG. 1 shows a light spot 100 occurring on a dark-field image 10. After local dimming, a halo 200 appears and is displayed on the dark-field image 10 shown in FIG. 2.

Under certain circumstances, for example, a starry sky image that belongs to a dark field is taken. The starry sky image has many light spots that may be processed by the local dimming process and make surrounding pixels be brightened. Accordingly, the checkerboard-type halos appear on the dark-field image 30 shown in FIG. 3. In FIG. 3, multiple halos 301, 302, 303, 304, 305 and 306 are schematically shown in the diagram.

Figure 4:
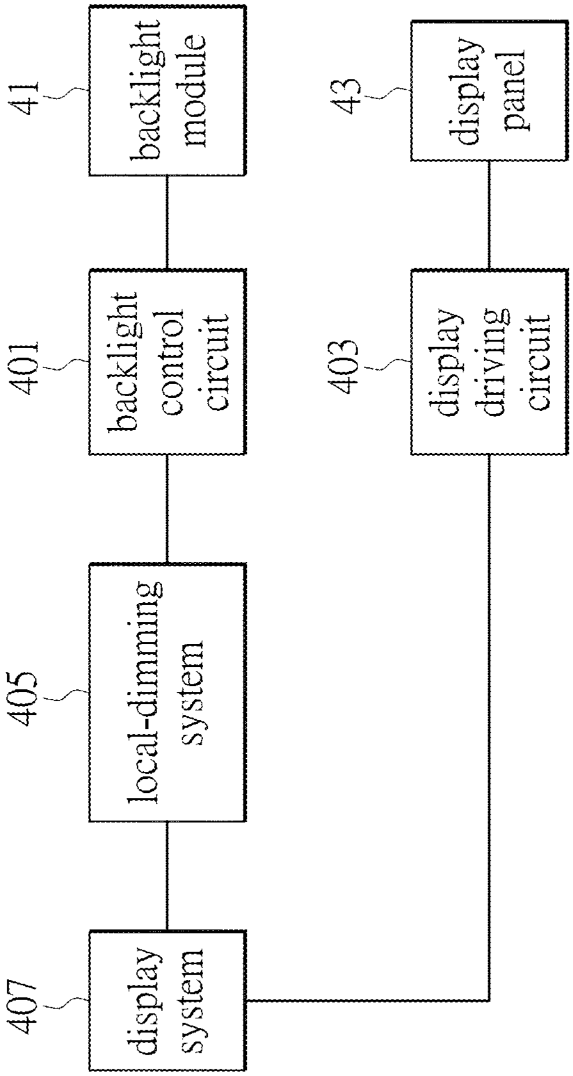
FIG. 4 is a schematic diagram illustrating a circuit system that performs a method for correcting local-dimming parameters through global backlight adjustment according to one embodiment of the present disclosure.

Thus, one of the objectives of the method for correcting local-dimming parameters through global backlight adjustment of the present disclosure is to solve the problem of halos formed on the dark-field image in the local dimming process through global backlight adjustment. Reference is made to FIG. 4, which is a schematic diagram illustrating the circuit system that performs the method for correcting local-dimming parameters through global backlight adjustment according to one embodiment of the present disclosure.

FIG. 4 schematically shows a circuitry of a display. A display system 407 receives image data transmitted from an image source. The image data is then decoded and decompressed for forming image signals. A display driving circuit 403 drives a display panel 43 to display the images that have been decoded and decompressed. A backlight control circuit 401 controls operations of the backlight module 41.

The circuit system of the present disclosure implements a local-dimming system 405. The local-dimming system 405 is electrically connected with a backlight control circuit 401 of a backlight module 41 of the display. The local-dimming system 405 performs the local dimming process that frame-by-frame divides the image into multiple regions. The local-dimming system 405 also provides corresponding local backlight brightness based on the brightness of each of the regions. The brightness of each of the regions is obtained according to a statistical value of every region. Accordingly, local-dimming parameters outputted to the backlight control circuit 401 are generated.

On the other hand, according to the embodiment of the present disclosure, the local-dimming system 405 also performs the method for correcting local-dimming parameters through global backlight adjustment. The local-dimming system 405 can detect the regions having dark-field halo and determine an impact of the dark-field halo on the whole image, i.e., a leakage level. A detection result of the regions having dark-field halo and a global average of the image are referred to for determining whether or not to perform global backlight adjustment on the image. If it is determined that global backlight adjustment is required to be performed for outputting the local-dimming parameters to the backlight control circuit 401 after global backlight adjustment, the local brightness of the backlight module 41 can therefore be controlled.

Figure 5:
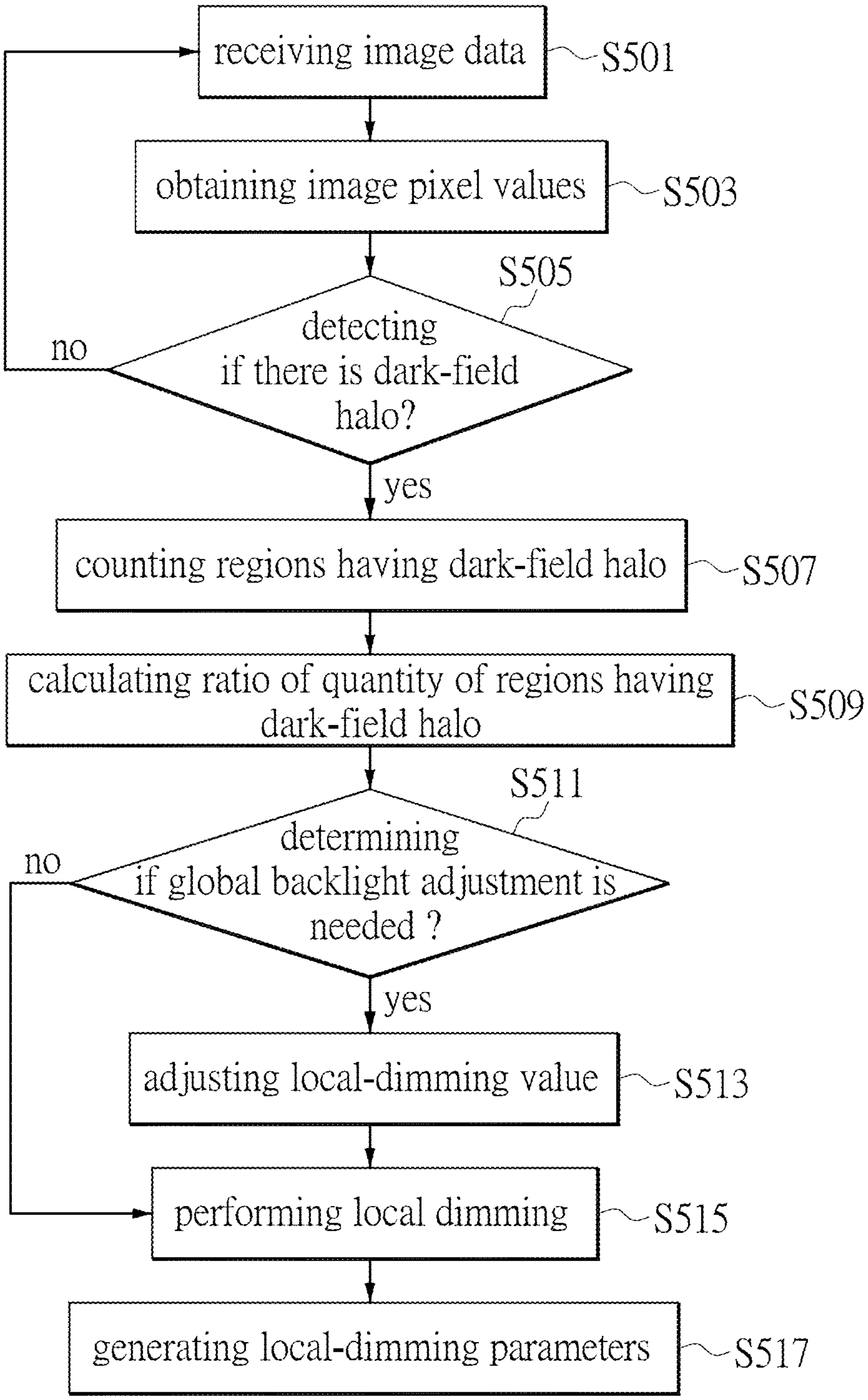
FIG. 5 is a flowchart illustrating the method for correcting local-dimming parameters through global backlight adjustment according to one embodiment of the present disclosure.

Reference is next made to FIG. 5, which is a flowchart describing the method for correcting local-dimming parameters through global backlight adjustment operated in the circuit system according to one embodiment of the present disclosure.

Figure 6:
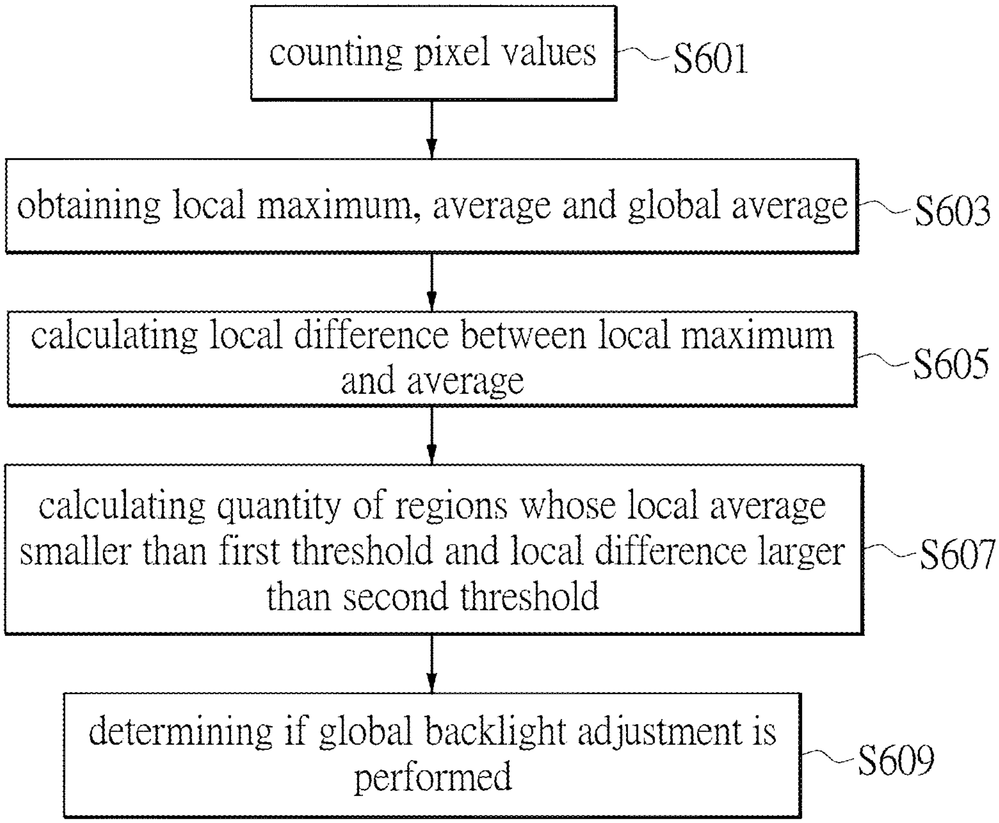
FIG. 6 is flowchart illustrating a process of determining whether or not to perform global backlight adjustment according one embodiment of the present disclosure.

When receiving image data (step S501), the circuit system performs a local dimming process, and the image data is frame-by-frame divided into multiple regions. For example, the multiple regions can be expressed by M*N regions, in which "M" denotes a quantity of regions in one of sides (e.g., a long side) of each of the frames, and "N" denotes a quantity of the regions in the other side (e.g., a short side) of the frame. After that, pixel values of each of the regions in each of the frames can be obtained through an image processing process (step S503), and statistics of pixel values of each of the regions is also obtained. According to one of the embodiments of the present disclosure, a local maximum and a local average of the pixel values of each of the regions are obtained, and a global average of the pixel values of a whole frame can be frame-by-frame obtained. Brightness characteristics of each of the regions can then be obtained according to the local maximum and the local average, and the brightness characteristics can be used to detect whether the frame includes any dark-field halo. According to one of the embodiments of the method for correcting local-dimming parameters through global backlight adjustment, a local difference between the local maximum and the local average of each of the regions is referred to for determining whether each of the regions has the dark-field halo. Afterwards, an equation shown below and a flowchart shown in FIG. 6 are referred to for obtaining one or more regions that include the dark-field halo in each of the frames (step S505).

For example, if the local difference between the local maximum and the local average is small, it indicates that the brightness distribution in the region does not change by much (e.g., smaller than a threshold set by the circuit system) and that there is no specific bright spot. On the contrary, if the local difference is larger than a threshold set by the circuit system, it indicates that there is a specific bright spot in the region and determines that there is a dark-field halo due to the local dimming process.

In the above determination step, if no dark-field halo is detected (represented as "no"), the flow goes back to step S501 for determining whether any dark-field halo occurs to a next frame in the local dimming process. Otherwise, if any dark-field halo is detected in the frame (represented as "yes"), the regions having the dark-field halo in a whole frame are counted (step S507). A quantity ratio of a quantity of the regions having the dark-field halo to the multiple regions of the frame is calculated (step S509). The embodiment of the above process can be referred to in the description of the following calculations.

Next, in the method for correcting local-dimming parameters through global backlight adjustment, the quantity ratio of the quantity of the regions having the dark-field halo to a quantity of regions of a whole frame is calculated, thereby determining whether global backlight adjustment is performed on the image when in the local dimming process (step S511). In one of the embodiments of the present disclosure, a ratio threshold is provided, and the quantity ratio of the quantity of the regions having the dark-field halo to the quantity of the regions of the whole frame is calculated. If the quantity ratio is smaller than or equal to the ratio threshold, it indicates that the quantity of the regions having the dark-field halo in the image is within an acceptable range, and it is not necessary to perform global backlight adjustment on the image, but only the local dimming process (step S515). Therefore, the local-dimming parameters can be directly outputted (step S517).

On the contrary, if the quantity ratio of the quantity of the regions having dark-field halo to the quantity of global regions of the image is larger than the ratio threshold, it indicates that a certain ratio of images have dark-field halo that already affect a user's viewing experience. Therefore, global backlight adjustment is required to be performed on the image. The circuit system adjusts the local-dimming parameters (step S513), and then performs the local dimming process (step S515). Afterwards, the local-dimming parameters after the global backlight adjustment is performed are outputted to the backlight control circuit (step S517).

In the flowchart described in FIG. 5, the step of determining whether the global backlight adjustment is performed can refer to the flowchart shown in FIG. 6 according to one embodiment of the present disclosure and the equations 1 to 3.

In the beginning of the flowchart, statistics of the received image is computed, in which a circuit of a display system computes statistics on the pixel values of each of the regions that are divided in each of the frames (step S601) so as to obtain a local maximum and a local average of the frame, and a global average thereof (step S603).

The global average can be calculated by regions in each of the frames. In equation 1, the variable "APL" indicates an average of pixel values of a whole frame, i.e., the global average, which is calculated in unit of region. A brightness average of each of the regions is represented as "Block_Ave [i][j]", in which "i" indicates an index value of the regions over a long side of the frame, and "j" indicates an index value of regions over a short side of the frame. After summing the brightness averages respective to the regions, the sum of the brightness averages is divided by a quantity of the regions ("M*N") of each of the frames so as to obtain the global average ("APL") of the regions of a whole frame.

$$APL = \left(\sum_{i=0}^{M-1}\sum_{j=0}^{N-1}\text{Block\_Ave}[i][j]\right)/(M*N). \quad \text{Equation 1}$$

Afterwards, in FIG. 6, a local difference between the local maximum and the local average in each of the regions of the frame is calculated (step S605). The circuit system sets a first threshold and a second threshold used to determine whether global backlight adjustment is performed on the image. The local average of each of the regions is compared with the first threshold, and then the local difference is compared with the second threshold so as to calculate a quantity of the regions whose local averages are smaller than the first threshold and the local differences are larger than the second threshold (step S607). This quantity of the regions is referred to for determining whether global backlight adjustment is performed on the image (step S609).

According to one embodiment of the present disclosure, when the global average is obtained through the step S603 and equation 1, the system provides a lookup table based on actual operations of backlight adjustment. The lookup table records multiple adjustment ratios of multiple global averages to corresponding reduced backlight brightness. Thus, the lookup table is queried according a real-time global average calculated from the image so as to obtain the adjustment ratio referred to for reducing backlight brightness when global backlight adjustment is performed on the image.

Further, in the determination step S609, in view of equation 2, the regions whose local averages ("Block_Ave[i][j]") are smaller than the first threshold ("TH1") can be used to obtain the dark field regions. The regions whose local differences ("Leakage[i][j]") between the local maximum ("Block_Max[i][j]") and the local average are larger than the second threshold ("TH2") can be used to obtain the dark field regions having the high brightness pixels that produce halos. Next, a quantity of the regions ("Leakage_BlockCnt") that are consistent with the above two conditions is obtained and a quantity ratio of the regions being consistent with the two conditions to the quantity of the regions ("M*N") of the whole frame can be calculated. The quantity ratio is used to describe a degree that the regions will generate halos through local dimming. The quantity ratio is also used to explain a leakage level of a display picture. The present example shows that the leakage levels can be 1023 levels. The main concept for obtaining the leakage level is that, in the method for correcting local-dimming parameters through global backlight adjustment, the backlight brightness for the frame in which more dark-field halos occur (i.e., higher leakage level) can be decreased by one level that corresponds to an adjustment ratio expressed as a percentage (%) so as to reduce halo phenomena.

$$\text{if Block\_Ave}[i][j] < TH1; \qquad \text{Equation 2}$$

$$\text{Leakage}[i][j] = \text{Block\_Max}[i][j] - \text{Block\_Ave}[i][j];$$

$$\text{if Leakage}[i][j] > TH2;\ \text{Leakage\_BlockCnt} + 1;$$

$$\text{Leakage\_Level} = 1023 * \text{Leakage\_BlockCnt}/(M * N).$$

According to certain embodiment of the method for correcting local-dimming parameters through global backlight adjustment of the present disclosure, when the leakage level is smaller than or equal to a level threshold set by the system, it indicates that the leakage level is within an acceptable range and it is not necessary to perform global backlight adjustment; on the contrary, when the leakage level is larger than the level threshold, it indicates that an unacceptable halo is formed, and global backlight adjustment will be proportionally performed according to the leakage level.

Thus, the circuit system can refer to the leakage level and the adjustment ratio corresponding to the global average for calculating a gain for global backlight adjustment. The local-dimming parameters are then processed with global backlight adjustment based on the gain. The gain used for global backlight adjustment is used to compensate the backlight brightness value when the whole backlight brightness of the display becomes darker due to the local dimming process under a specific circumstance (e.g., under a starry night).

According to the above embodiments of the present disclosure, the global average obtained by computing statistics of the pixel values is used to query a lookup table to decide an adjustment ratio (APLgain). The adjustment ratio is referred to for reducing the backlight brightness. When the adjustment ratio is in view of the leakage level ("Leakage Level") obtained by the above embodiments, the gain for global backlight adjustment can be instantly calculated. One of the embodiments for calculating the gain can be referred to in equation 3.

$$APL_{gain} = \text{APL\_GAIN\_LUT}(gAPL); \qquad \text{Equation 3}$$

$$G_{dimming} = APL_{gain} - \left(\text{Leakage}_{gain} * \frac{\text{Leakage\_Level}}{1023}\right).$$

The lookup table can be expressed by "APL_GAIN_LUT" function, the global average is represented as "gAPL" and the adjustment ratio for decreasing the backlight brightness that is obtained by querying the lookup table is represented as "APLgain." Accordingly, the circuit system obtains the local-dimming parameters through local dimming and outputs the local-dimming parameters to the backlight control circuit. The local-dimming parameters are then converted to the electrical signals for each of the regions of the backlight module by the backlight control circuit.

In conclusion, according to the above embodiment of the method for correcting local-dimming parameters through global backlight adjustment and the circuit system, in addition to the conventional local dimming technology, the situations of dark-field halo or checkerboard halo that is formed due to local dimming performed on the images with dark field are also considered, the method can optimize the conventional local dimming process through global backlight adjustment and also improve the user's viewing experience when viewing a displayed content.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for correcting local-dimming parameters through global backlight adjustment, performed in a circuit system, comprising:

receiving an image and obtaining pixel values of each of multiple regions divided from the image;

detecting one or more regions having dark-field halo from the multiple regions according to the pixel values of each of the multiple regions; and determining whether or not to perform the global backlight adjustment on the image when a local dimming process is performed on the image according to a quantity ratio of a quantity of regions having dark-field halo to a quantity of global regions.

2. The method according to claim 1, wherein the image is divided into the multiple regions, a local backlight brightness corresponding to each of the regions is provided according to the pixel values of each of the regions, and the circuit system outputs local-dimming parameters to a backlight control circuit after the local dimming process is performed.

3. The method according to claim 2, wherein a local maximum and a local average of each of the multiple regions are obtained according to the pixel values of each of the regions, and a local difference between the local maximum and the local average of each of the regions is referred to for determining whether any dark-field halo occurred in each of the regions.

4. The method according to claim 3, wherein, when the quantity ratio of the quantity of the regions having dark-field halo to the quantity of global regions is larger than a ratio threshold, the global backlight adjustment is performed on the image, and the circuit system outputs local-dimming parameters through the global backlight adjustment to the backlight control circuit.

5. The method according to claim 4, wherein the pixel values of each of the multiple regions divided from the image are calculated, and a global average of the image is obtained; when the quantity ratio of the quantity of the regions having dark-field halo to the quantity of global regions is larger than the ratio threshold, the global average is referred to for determining whether the global backlight adjustment is to be performed on the image.

6. The method according to claim 5, wherein an adjustment ratio for reducing backlight brightness when global backlight adjustment is performed on the image is obtained by querying a lookup table according to the global average; wherein the lookup table records multiple adjustment ratios of multiple global averages to corresponding reduced backlight brightness.

7. The method according to claim 6, wherein a quantity of regions of which the local average of each of the multiple regions is smaller than a first threshold and the local difference is larger than a second threshold is counted; and a ratio of the quantity of the regions to the quantity of global regions indicates a halo level after the local dimming process is performed on the image, and both the halo level and the adjustment ratio corresponding to the global average are referred to for calculating a gain used for performing global backlight adjustment.

8. The method according to claim 7, wherein, when the halo level is smaller than or equal to a level threshold, the global backlight adjustment is not performed; and, when the halo level is larger than the level threshold, the global backlight adjustment is proportionally performed according to the halo level.

9. A circuit system electrically connected with a backlight control circuit, and the circuit system performing a method for correcting local-dimming parameters through global backlight adjustment, comprising:

receiving an image and obtaining pixel values of each of multiple regions divided from the image;

detecting one or more regions having dark-field halo from the multiple regions according to the pixel values of each of the multiple regions; and determining whether or not to perform global backlight adjustment on the image when a local dimming process is performed on the image according to a quantity ratio of a quantity of regions having dark-field halo to a quantity of global regions.

10. The circuit system according to claim 9, wherein the circuit system operates the method for correcting local-dimming parameters through global backlight adjustment by firmware or a system on a chip; in the method, the image is divided into the multiple regions, a local backlight brightness corresponding to each of the regions is provided according to the pixel values of each of the regions, and the circuit system outputs local-dimming parameters to a backlight control circuit after the local dimming process is performed.

11. The circuit system according to claim 10, wherein a local maximum and a local average of each of the multiple regions are obtained according to the pixel values of each of the regions, and a local difference between the local maximum and the local average of each of the regions is referred to for determining whether any dark-field halo occurred in each of the regions.

12. The circuit system according to claim 11, wherein, when the quantity ratio of the quantity of the regions having dark-field halo to the quantity of global regions is larger than a ratio threshold, the global backlight adjustment is performed on the image, and the circuit system outputs local-dimming parameters through the global backlight adjustment to the backlight control circuit.

13. The circuit system according to claim 12, wherein the pixel values of each of the multiple regions divided from the image are calculated, and a global average of the image is obtained; when the quantity ratio of the quantity of the regions having dark-field halo to the quantity of global regions is larger than the ratio threshold, the global average is referred to for determining whether the global backlight adjustment is to be performed on the image.

14. The circuit system according to claim 13, wherein an adjustment ratio for reducing backlight brightness when global backlight adjustment is performed on the image is obtained by querying a lookup table according to the global average; wherein the lookup table records multiple adjustment ratios of multiple global averages to corresponding reduced backlight brightness.

15. The circuit system according to claim 14, wherein a quantity of regions of which the local average of each of the multiple regions is smaller than a first threshold and the local difference is larger than a second threshold is counted; and a ratio of the quantity of the regions to the quantity of global regions indicates a halo level after the local dimming process is performed on the image, and both the halo level and the adjustment ratio corresponding to the global average are referred to for calculating a gain used for performing global backlight adjustment.

* * * * *